United States Patent
Mattsson et al.

(10) Patent No.: US 8,784,257 B2
(45) Date of Patent: Jul. 22, 2014

(54) CONTINUOUSLY VARIABLE TRANSMISSION AND A WORKING MACHINE

(75) Inventors: Per Mattsson, Hindås (SE); Mats Åkerblom, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 134 days.

(21) Appl. No.: 13/643,092

(22) PCT Filed: May 6, 2010

(86) PCT No.: PCT/SE2010/000125
§ 371 (c)(1),
(2), (4) Date: Nov. 8, 2012

(87) PCT Pub. No.: WO2011/139186
PCT Pub. Date: Nov. 10, 2011

(65) Prior Publication Data
US 2013/0137543 A1    May 30, 2013

(51) Int. Cl.
*F16H 37/02* (2006.01)
*F16H 3/72* (2006.01)
*F16H 3/46* (2006.01)
*F16H 47/04* (2006.01)
*E02F 9/22* (2006.01)
*F16H 37/08* (2006.01)

(52) U.S. Cl.
CPC .......... *F16H 3/46* (2013.01); *F16H 2200/2005* (2013.01); *F16H 2200/2023* (2013.01); *F16H 3/725* (2013.01); *F16H 3/72* (2013.01); *F16H 2037/0886* (2013.01); *F16H 47/04* (2013.01); *E02F 9/2253* (2013.01)
USPC ....................................................... 475/207

(58) Field of Classification Search
USPC .............. 475/5, 6, 72–74, 84, 149–151, 198, 475/207, 218, 295, 296, 302, 329
See application file for complete search history.

(56) References Cited

U.S. PATENT DOCUMENTS 5,403,241 A    4/1995  Jarchow et al.
6,099,431 A    8/2000  Hoge
(Continued)

FOREIGN PATENT DOCUMENTS

AT    500431 B1    11/2006
DE    10307164 A1    9/2004
(Continued)

OTHER PUBLICATIONS

European Official Action (Feb. 26, 2014) for corresponding European App. EP 10851110.6.
International Search Report (Jan. 27, 2011) for corresponding International application No. PCT/SE2010/000125.

*Primary Examiner* — Justin Holmes
(74) *Attorney, Agent, or Firm* — WRB-IP LLP (57) ABSTRACT

A continuously variable transmission has an input shaft and an output shaft. The transmission includes a variator unit having an input shaft and an output shaft, and a planetary gear wheel unit having a planet carrier, a first sun wheel and a second sun wheel. The input shaft of the transmission is rotationally connectable to the planet carrier and to the input shaft of the variator unit, and a shaft rotationally fixed to the first sun wheel is rotationally connectable to the output shaft of the variator unit. The planet carrier is provided with a first inner set of planet wheels for meshing engagement with the first sun wheel and a second outer set of planet wheels for meshing engagement with the second sun wheel. The first and second sets of planet wheels are in meshing engagement with each other, and a shaft rotationally fixed to the second sun wheel is rotationally connectable to the output shaft of the transmission via a first output member for obtaining a powersplit mode in which power is transmitted via the second sun wheel.

16 Claims, 7 Drawing Sheets

(56) References Cited

U.S. PATENT DOCUMENTS

| | | | |
|---|---|---|---|
| 7,195,573 B2* | 3/2007 | Bezian et al. | 475/5 |
| 2002/0045511 A1 | 4/2002 | Geiberger et al. | |
| 2005/0075209 A1* | 4/2005 | Wafzig et al. | 475/216 |
| 2006/0183590 A1* | 8/2006 | Jackson | 475/210 |
| 2006/0264296 A1* | 11/2006 | Moeller | 475/275 |
| 2010/0197440 A1* | 8/2010 | Bailly et al. | 475/83 |
| 2010/0203998 A1* | 8/2010 | Bailly et al. | 475/214 |

FOREIGN PATENT DOCUMENTS

| | | |
|---|---|---|
| EP | 0428865 A2 | 5/1991 |
| EP | 0513674 A1 | 11/1992 |
| GB | 2418235 A | 3/2006 |
| JP | 2007046673 A | 2/2007 |
| WO | 2009068796 A1 | 6/2009 |

\* cited by examiner

CONTINUOUSLY VARIABLE TRANSMISSION AND A WORKING MACHINE

BACKGROUND AND SUMMARY

The invention relates to a continuously variable transmission and a working machine comprising such a continuously variable transmission.

The invention is applicable on working machines within the fields of industrial construction machines, in particular wheel loaders and articulated haulers. Although the invention will be described hereinafter with respect to a wheel loader, the invention is not restricted to this particular machine, but may also be used in other heavy working machines, such as dump trucks, graders, excavators or other construction equipment.

A working machine is provided with a bucket, container or other type of implement for digging, lifting, carrying and/or transporting a load. A working machine may be operated with large and heavy loads in areas where there are no roads, for example for transports in connection with road or tunnel building, sand pits, mines and similar environments.

A wheel loader is usually provided with a prime mover, such as an internal combustion engine, a transmission line with a torque converter and a gearbox for supplying power to the driving wheels of the wheel loader. In addition to supply power to the driving wheels, the internal combustion engine has to supply power to one or more hydraulic pumps of a hydraulic system of the wheel loader. Such a hydraulic system is used for lifting operations and/or steering the wheel loader.

Hydraulic working cylinders are arranged for lifting and lowering a lifting arm unit, on which a bucket, forks or other type of attachment or working tool is mounted. By use of another hydraulic working cylinder, the bucket can also be tilted or pivoted. Further hydraulic cylinders known as steering cylinders are arranged to turn the wheel loader by means of relative movement of a front body part and a rear body part of the wheel loader which body parts are pivotally connected relative to each other.

The gearbox can be a continuously variable transmission (CVT) having a variator unit which gives a lot of advantages compared to a stepped gearbox. For example, the velocity of the working machine can be controlled independently of the speed of rotation of the prime mover. If the continuously variable transmission has a speed of rotation range comprising a mode where the rotation speed of the output shaft of the gearbox is zero or close to zero independently of the rotation speed of the input, shaft of the gearbox at the same time as torque can be transmitted from the input shaft to the output shaft (usually referred to as an infinitely variable transmission (IVT) with geared neutral), the torque converter traditionally used in working machines can be omitted. By the expression "zero or close to zero" is meant a speed of rotation of the output shaft which is zero or in the size of a few rotations per minute.

By the geared neutral function the operation of the hydraulic system can also be separated from the propulsion of the working machine. Furthermore, the hydraulic system can be driven by the prime mover when the working machine stands still without using any clutch for disengagement of the prime mover relative to the transmission line.

The continuously variable transmission may have a planetary gear wheel unit enabling the power transmitted to be split between the variator unit and the planetary gear wheel unit. By such a gearbox having a powersplit (PS), in many operation modes only a minor part of the power has to be transmitted by the variator unit. The remaining power is transmitted by the planetary gear wheel unit. This implies an improved overall efficiency since the loss of energy is considerably smaller with respect to the planetary gear wheel unit compared to the variator unit. Furthermore, the size of the variator unit can be reduced.

A prior art continuously variable transmission is disclosed in U.S. Pat. No. 5,403,241. The gearbox described in U.S. Pat. No. 5,403,241 has a variator unit and a planetary gear wheel unit. A disadvantage with this gearbox is that the speed ratio range will be limited in some of the powersplit modes. For each mode, the speed ratio range depends on one or more basic gear ratios of the planetary gear wheel unit. For the mentioned powersplit modes the speed ratio range depends on one basic gear ratio. Here, the speed ratio range will increase with a lower absolute value of this basic gear ratio. The lowest possible absolute value of this basic gear ratio is, however, limited by geometrical conditions. The gear ratio is defined by the ratio between the diameter of the ring wheel and the diameter of the sun wheel. The absolute value of the basic gear ratio can be decreased to some extent by reducing the size of the planet wheels, but due to the fact that the planet wheels have to be designed with a smallest allowed diameter the lowest possible absolute value of the basic gear ratio is limited, and, thus the speed ratio range will be limited.

It is desirable to provide a continuously variable transmission defined by way of introduction, which transmission enables an increased speed ratio range in a powersplit mode of the transmission.

In a continuously variable transmission according to an aspect of the invention, the basic gear ratio of the planetary gear wheel unit is defined by the ratio between the diameter of the second sun wheel and the diameter of the first sun wheel. This implies that the geometrical limitation with respect to the size of the planet wheels associated with the prior art transmission is eliminated, and that the lowest possible absolute value of the basic gear ratio can be decreased and the speed ratio range can be increased accordingly.

This in turn gives the possibility to use a transmission with reduced number of powersplit modes in for example certain wheel loader applications where a reduced number of powersplit modes is desired and still provide the requisite speed ratio range.

In addition, the transmission according to the invention is cost effective, since one planet carrier and one ring wheel can be eliminated, and there is no need to connect two planet carriers to the input shaft or to connect a sun wheel of a first unit to a ring wheel of a second unit which ring wheel in turns to be connected to an output shaft. The invention also enables a more compact design, at least in the axial direction of the planetary gear wheel unit.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
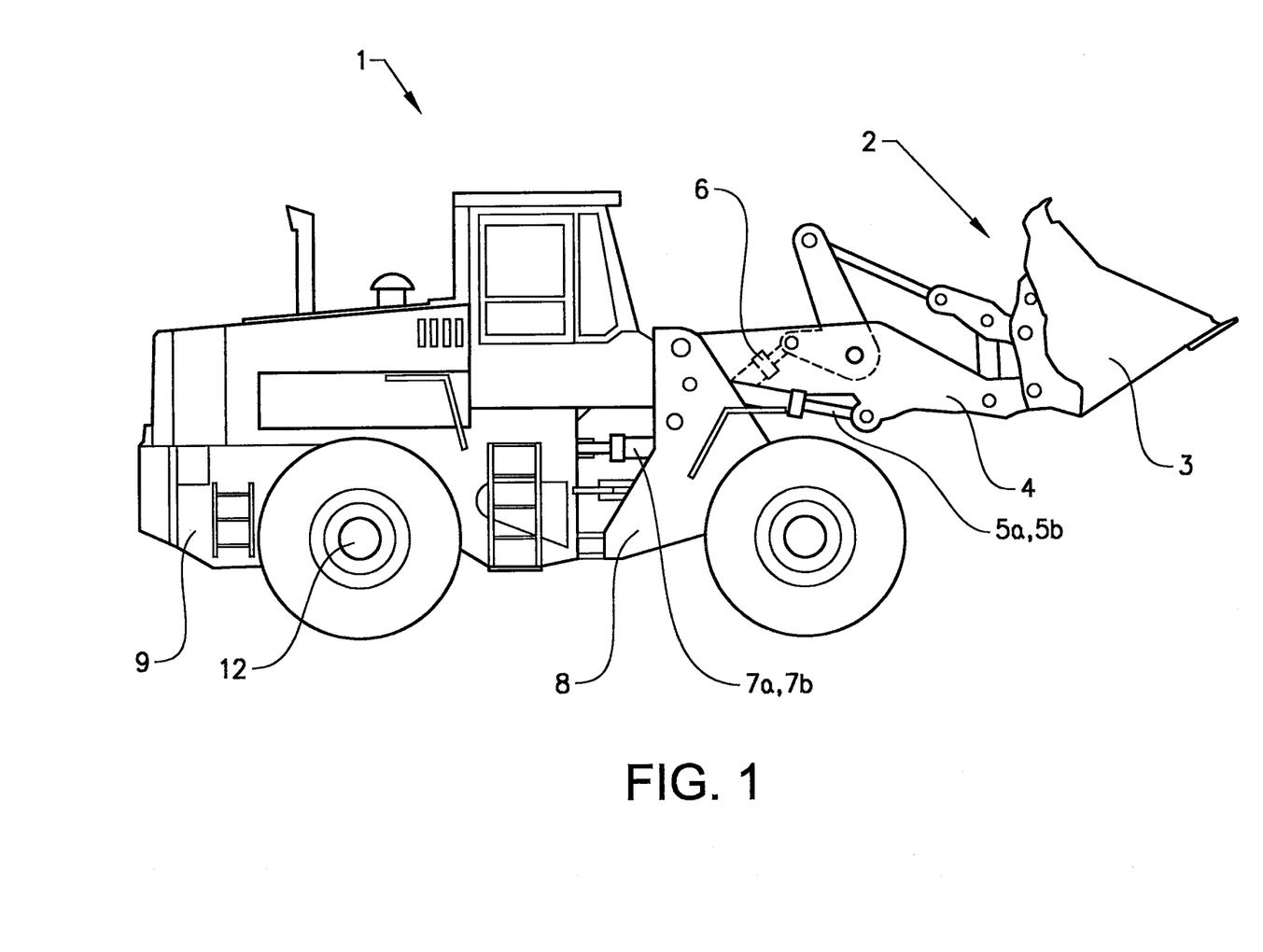
FIG. 1 is a lateral view illustrating a wheel loader having a bucket for loading operations, and a hydraulic system for operating the bucket and steering the wheel loader.

FIG. 1 is an illustration of a working machine 1 in the form of a wheel loader having an implement 2. The term "implement" is intended to comprise any kind of tool using hydraulics, such as a bucket, a fork or a gripping tool arranged on a wheel loader, or a container arranged on an articulated hauler. The implement illustrated comprises a bucket 3 which is arranged on an arm unit 4 for lifting and lowering the bucket 3, and further the bucket 3 can be tilted or pivoted relative to the arm unit 4. The wheel loader 1 is provided with a hydraulic system comprising at least one hydraulic machine (not shown in FIG. 1). The hydraulic machine can be a hydraulic pump, although it is preferred that the hydraulic machine can work as a hydraulic pump as well as a hydraulic motor with a reversed flow of hydraulic fluid. Such a hydraulic machine with said both functions can be used as a pump for providing the hydraulic system with hydraulic fluid, for example to lift and tilt the bucket, and as a hydraulic motor for recuperation of energy, for example during a lowering operation of the implement 2. In the example embodiment illustrated in FIG. 1 the hydraulic system comprises two hydraulic cylinders 5a, 5b for the operation of the arm unit 4 and a hydraulic cylinder 6 for tilting the bucket relative to the arm unit 4. Furthermore the hydraulic system comprises two hydraulic cylinders 7a, 7b arranged on opposite sides of the wheel loader for turning the wheel loader by means of relative movement of a front body part 8 and a rear body part 9. In other words; the working machine is frame-steered by means of the steering cylinders 7a, 7b.

Figure 2:
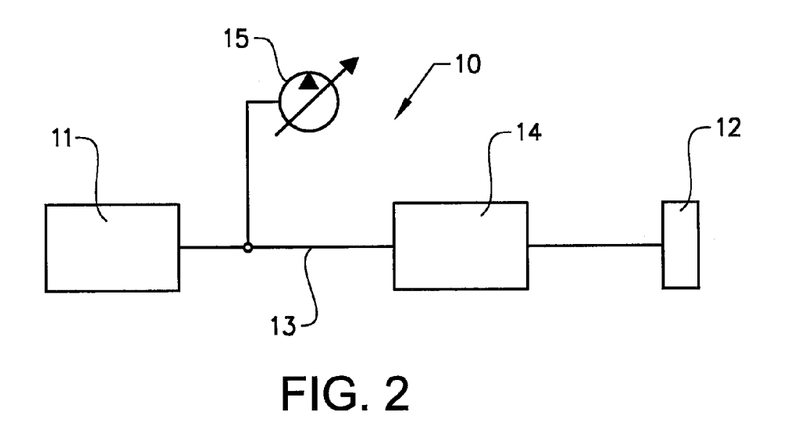
FIG. 2 is a schematic illustration of a drive train of the working machine illustrated in FIG. 1.

FIG. 2 is a schematic illustration of a drive train 10 of the working machine 1 illustrated in FIG. 1. The drive train 10 comprises a prime mover 11 for supplying power to the driving wheels 12 of the working machine, and a transmission line 13 arranged between the prime mover 11 and the driving wheels 12 for transmitting power from the prime mover 1 to the driving wheels 12. The driving wheels 12 are schematically illustrated in FIG. 2. However, any number of wheels and wheel axles can be used in the working machine according to the invention. For example, there can be one front axle and one rear axle as illustrated in FIG. 1 and some or all of the wheels can be driven wheels. Although the prime mover 11 is preferably an internal combustion engine (ICE), for example a diesel engine, other prime movers such as for example Stirling engines can also be used. The transmission line 13 comprises a continuously variable transmission 14 according to the invention, which transmission is arranged between the prime mover 11 and the driving wheels 12.

In FIG. 2 said at least one hydraulic machine 15 for moving the implement 2 arranged on the working machine 1 and/or for steering the working machine 1 is schematically illustrated. The working machine can be equipped with one or more hydraulic machines for providing the hydraulic fluid required.

Figure 3A:
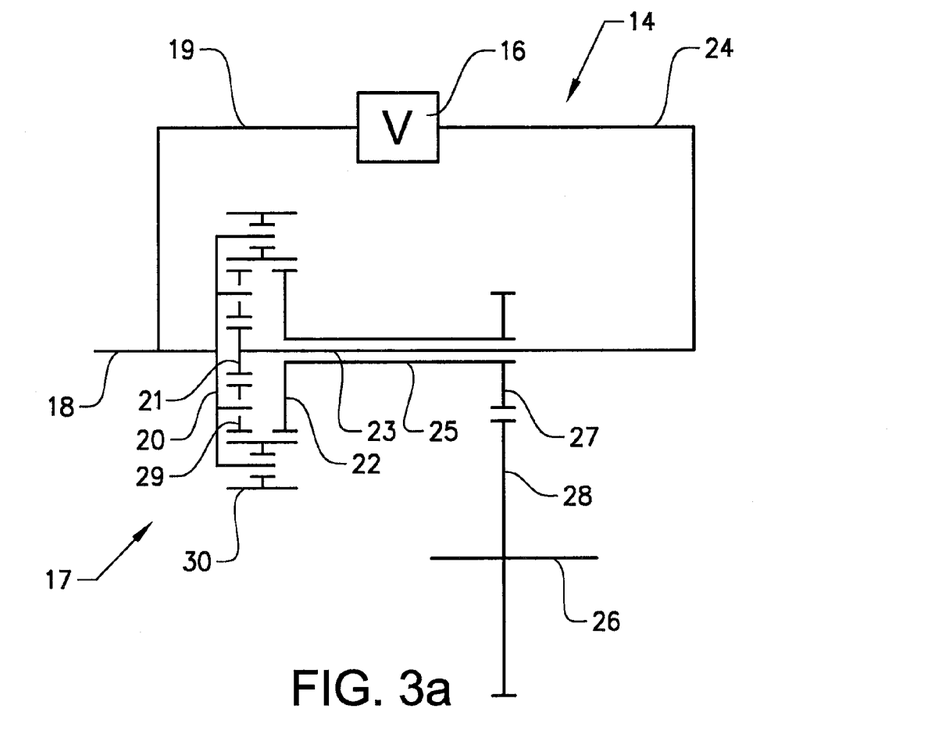
FIG. 3a is a schematic illustration of a continuously variable transmission according to the invention.
Figure 3B:
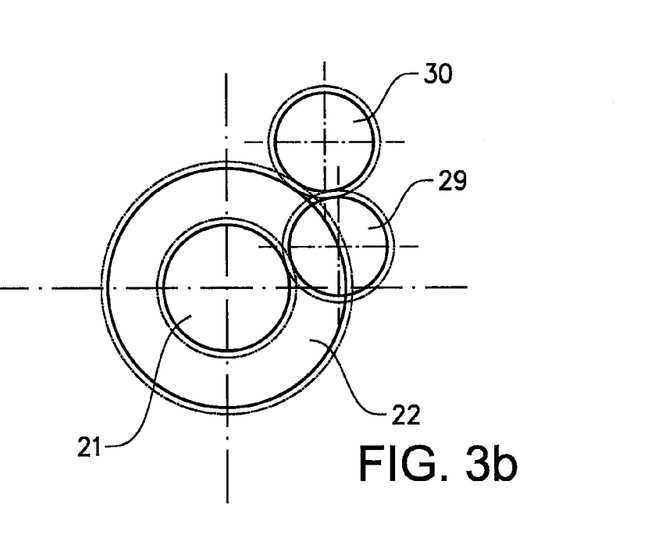
FIG. 3b is a lateral view of the planetary gear wheel unit of the continuously variable transmission in FIG. 3a, FIG. 4 is a further embodiment of the continuously variable transmission according to the invention.

In FIGS. 3a and 3b schematic illustrations of a first embodiment example of the continuously variable transmission 14 according to the invention are shown. The transmission or gearbox is a continuously variable transmission (CVT) with powersplit (PS).

The transmission 14 comprises a variator unit 16 and a planetary gear wheel unit 17. An input shaft 18 of the transmission is rotationally connectable to an input shaft 19 of the variator unit 16 and to a planet carrier 20 of the planetary gear wheel unit 17. The variator unit 16 is preferably a hydraulic variator. Generally, a hydraulic variator has improved efficiency, reduced size and is cost-effective in comparison to an electric variator or a mechanical variator. Although the variator unit can be designed in different ways, the variator unit preferably comprises two hydraulic machines (see FIG. 4) and at least one of these hydraulic machines has a variable displacement. The power transmitted by the gearbox can be split between the variator unit 16 and the planetary gear wheel unit 17.

The planetary gear wheel unit 17 comprises a first sun wheel 21 and a second sun wheel 22. A shaft 23 rotationally fixed to the first sun wheel 21 is rotationally connectable to an output shaft 24 of the variator unit 16, and a shaft 25 rotationally fixed to the second sun wheel 22 is rotationally connectable to an output shaft 26 of the transmission 14 via a first, output member 27 for obtaining a powersplit mode. The first output member is preferably a gear wheel 27 which can be in meshing engagement with another gear wheel 28 for transmission of power to the output shaft 26.

The planet carrier 20 is provided with a first inner set of planet wheels 29 for meshing engagement with the first sun wheel 21 and a second outer set of planet wheels 30 for meshing engagement with the second sun wheel 22. The first and second sets of planet wheels are in meshing engagement with each other.

Please observe that though FIG. 3a schematically shows how the gear wheels are in meshing engagement with each other, the relative positions of the axes of the gear wheels are more correctly depicted in FIG. 3b showing a lateral view of the planetary gear wheel unit 17. By positioning the second set of planet wheels 30 closer to the centre of the planetary gear wheel unit 17 and/or by positioning the first set of planet wheels 29 at a larger distance from the centre, the difference in size between the first sun wheel 21 and the second sun wheel 22 can be reduced. Thereby the planetary gear unit 17 can be provided with an extremely low absolute value of the basic gear ratio (defined by the ratio between the diameter of second sun wheel 22 and the diameter of the first sun wheel 21) in the size of 1.1-1.8.

Figure 4:
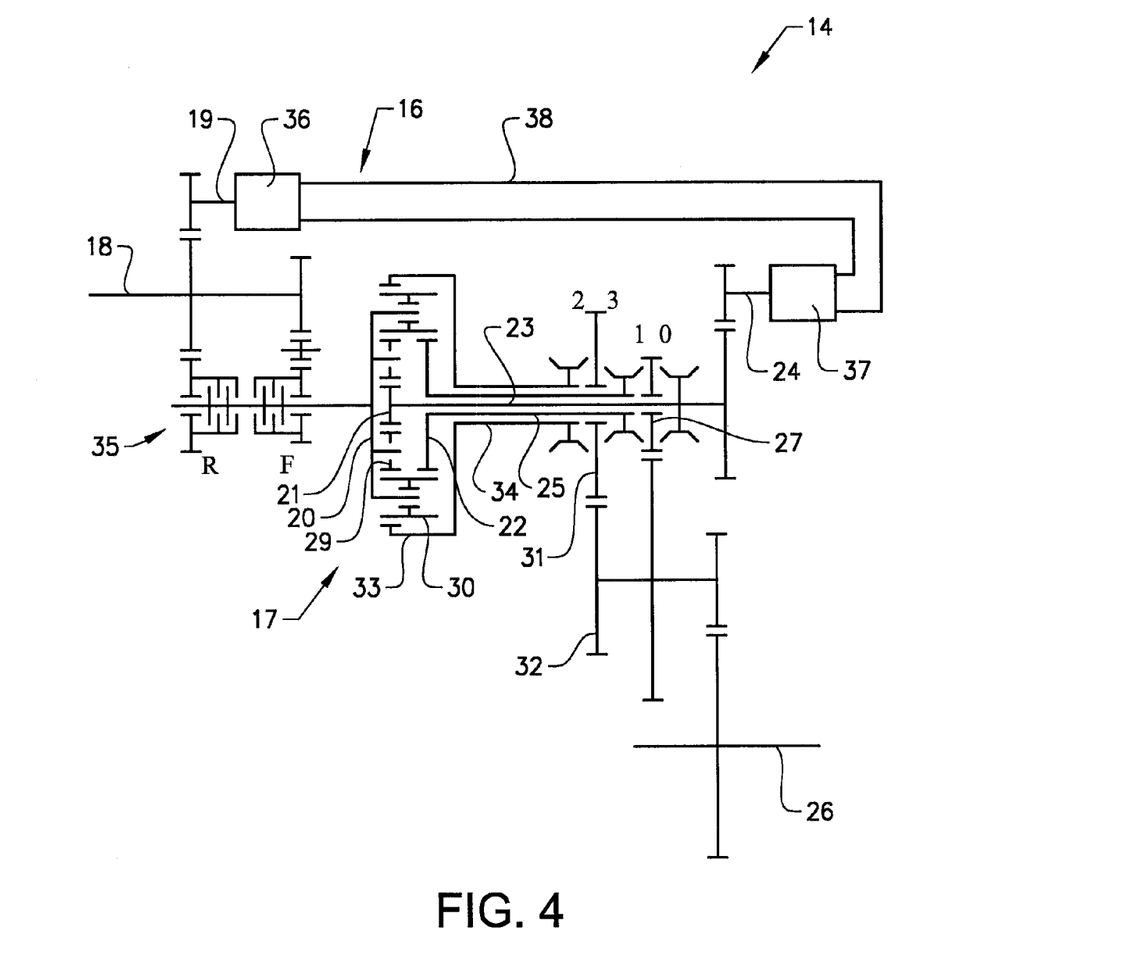

FIG. 4 illustrates a further embodiment example of the continuously variable transmission 14 according to the invention. Same reference numerals used for two or more embodiments indicate same or similar components, and these components already described will only be briefly described or not described with respect to subsequent embodiments.

As also described with respect to the embodiment illustrated in FIGS. 3a and 3b, a shaft 25 rotationally fixed to the second sun wheel 22 is rotationally connectable to the output shaft 26 via a first output member 27 for obtaining a powersplit mode. In addition, the transmission 14 comprises a second output member 31 for transmission of power to the output shaft 26, and the shaft 25 rotationally fixed to the second sun wheel 22 is rotationally connectable to the output shaft 26 via the second output member 31 for obtaining a further powersplit mode. The second output member is preferably a gear wheel 31 which can be in meshing, engagement with another gear wheel 32 for transmission of power to the output shaft 26.

In the embodiment illustrated in FIG. 4, the planetary gear wheel unit 7 comprises a ring wheel 33 arranged for meshing engagement with the second set of planet wheels 30 and a shaft 34 rotationally fixed to the ring wheel 33 is rotationally connectable to the output shaft 26 for obtaining a further powersplit mode. The shaft 34 rotationally fixed to the ring wheel 33 is rotationally connectable to the output shaft 26 via the second output member 31. This implies that the transmission 14 in the embodiment illustrated in FIG. 4 has a first, a second and a third powersplit mode illustrated by the clutches ", "2" and "3" in FIG. 4.

Furthermore, the output shaft 24 of the variator unit is rotationally connectable to the output shaft 26 for obtaining a variator mode. In the embodiment illustrated in FIG. 4 the output shaft 24 of the variator unit is rotationally connectable to the output shaft 26 via said first output member 27. This implies that the transmission 14 has a variator mode illustrated by the clutch "0" in FIG. 4.

Preferably, the transmission comprises a gear unit 35 for providing forward and backward rotation of the output shaft 26. The forward and backward gear unit 35 can be arranged at the input shaft 18 of the transmission 14 as illustrated in FIG. 4. This arrangement gives reduced size of the gear unit 35 compared to an arrangement where the gear unit is arranged at the output shaft of the transmission where the torque is higher.

The variator unit 16 comprises a first hydraulic machine 36 provided with the input shaft 19 and a second hydraulic machine 37 provided with the output shaft 24, the first and second hydraulic machines 36, 37 being hydraulically connected to each other by means of hydraulic conduits 38. By the expression "hydraulic machine" is meant a machine which can transform mechanical work into hydraulic pressure and flow and vice versa.

In an alternative embodiment, the variator unit 16 could however be an electrical variator. Then, the variator could instead comprise a first electric machine with said input shaft 19 and a second electric machine with said output shaft 24, the first and second electric machines being electrically connected to each other by means of electric cables. By the expression "electric machine" is meant a machine which can transform mechanical work into electricity and vice versa.

Figure 4B:
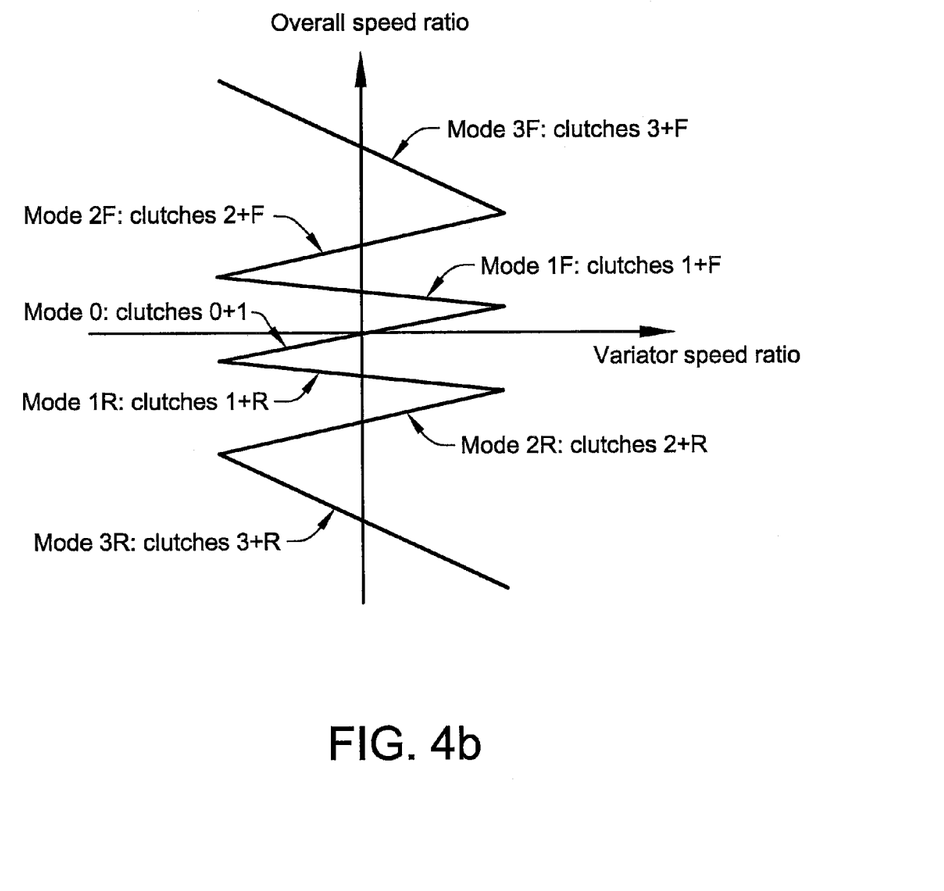
FIG. 4b shows the speed ratio of the transmission in FIG. 4 for different operating modes.

FIG. 4*b* illustrates how the transmission overall speed ratio varies with the variator speed ratio for the different modes with respect to the embodiment illustrated in FIG. 4. The overall speed ratio is defined as the speed of the output shaft 26 of the transmission divided by the speed of the input shaft 18 of the transmission. The variator speed ratio is defined as the speed of the output shaft 24 of the variator unit divided by the speed of the input shaft 19 of the variator unit. The variator mode is used for low speed driving in forward F and reverse R direction. Then, there are three powersplit modes for forward F as well as three powersplit modes for reverse R.

The variator mode is also preferably provided with geared neutral (GN). The geared neutral implies that there is an operation mode of the gearbox where the rotation speed of the output shaft of the gearbox is zero or close to zero independently of the rotation speed of the input shaft of the gearbox at the same time as torque can be transmitted from the input shaft to the output shaft of the gearbox.

Figure 5:
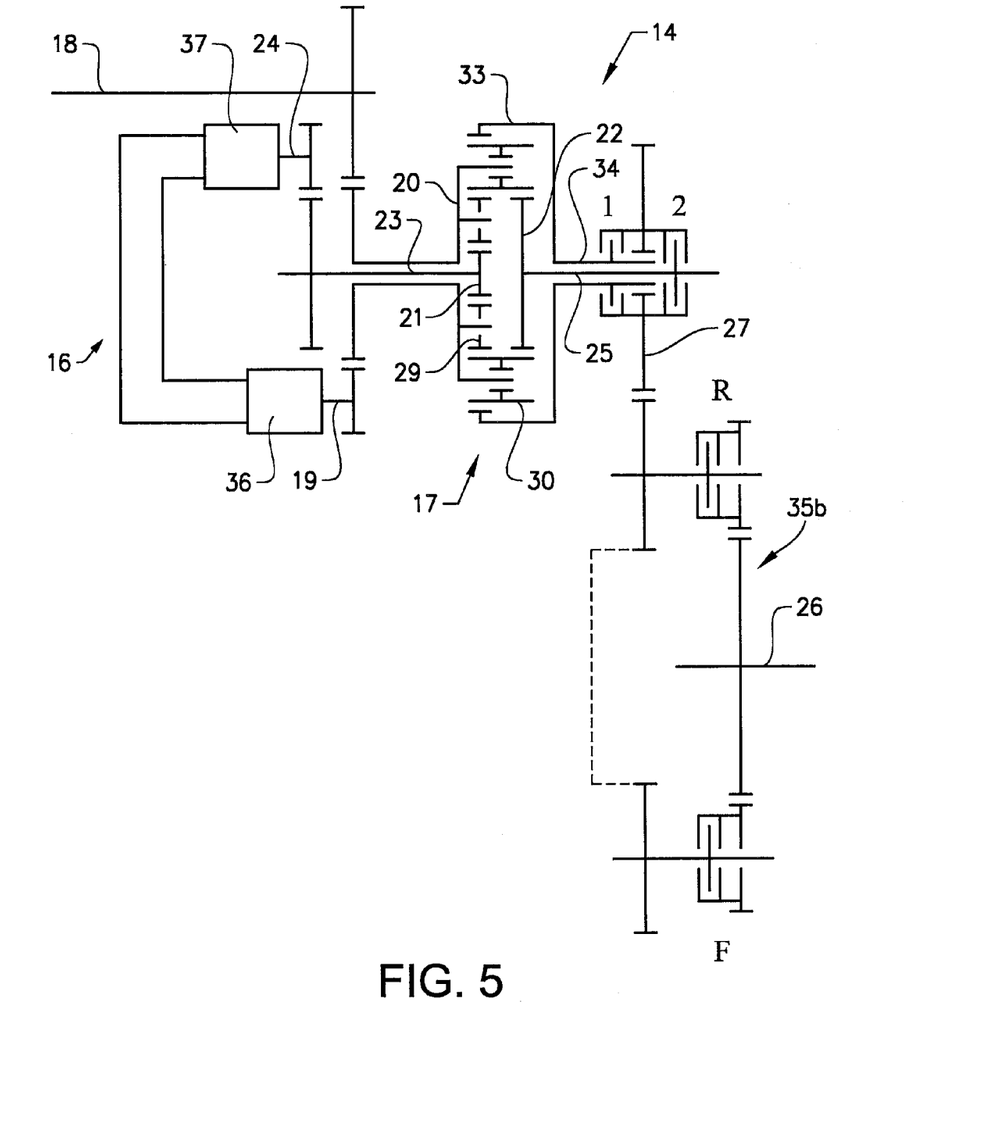
FIG. 5 is a further embodiment of the continuously variable transmission according to the invention.

In FIG. 5 a further embodiment of the continuously variable transmission 14 according to the invention is illustrated. As previously described, a shaft 25 rotationally fixed to the second sun wheel 22 is rotationally connectable to the output shaft 26 via a first output member 27 for obtaining a powersplit mode. In addition, the planetary gear wheel unit 17 comprises a ring wheel 33 arranged for meshing engagement with the second set of planet wheels 30 and a shaft 34 rotationally fixed to the ring wheel 33 is rotationally connectable to the output shaft 26 for obtaining a further powersplit mode. The shaft 34 rotationally fixed to the ring wheel 33 is rotationally connectable to the output shaft 26 via said first output member 27. This implies that the transmission has a first powersplit mode illustrated by the clutch " in FIG. 5 and a second powersplit mode illustrated by clutch "2" in FIG. 5.

The transmission further comprises a gear unit 35*b* for providing forward and backward rotation of the output shaft 26. In the embodiment illustrated in FIG. 5 the gear unit 35*b* is arranged at the output shaft 26 of the transmission 14.

Figure 5B:
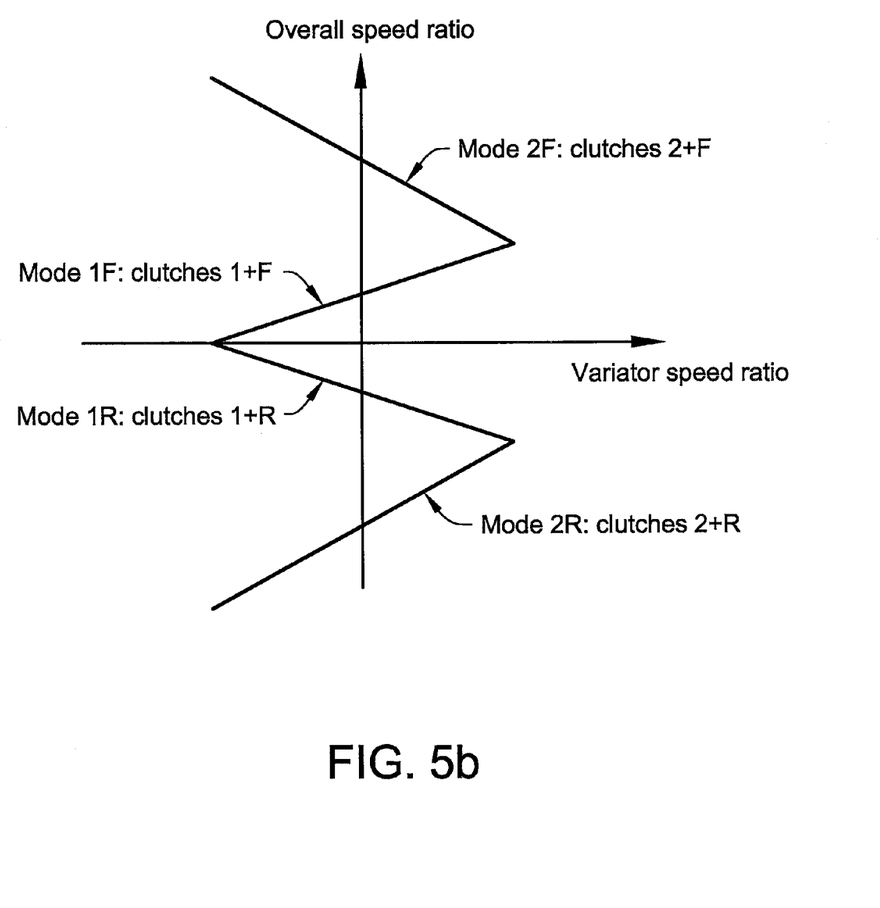
FIG. 5b shows the speed ratio of the transmission in FIG. 5 for different operating modes.

FIG. 5*b* illustrates how the transmission overall speed ratio varies with the variator speed ratio for the different modes with respect to the embodiment illustrated in FIG. 5. The overall speed ratio is defined as the speed of the output shaft 26 of the transmission divided by the speed of the input shaft 18 of the transmission. The variator speed ratio is defined as the speed of the output shaft 24 of the variator unit divided by the speed of the input shaft 19 of the variator unit. There are two powersplit modes for forward F as well as two powersplit modes for reverse R. Preferably, the first power split mode includes a geared neutral (GN).

It is to be understood that the present invention is not limited to the embodiments described above and illustrated in the drawings; rather, the skilled person will recognize that many changes and modifications may be made within the scope of the appended claims. For example, different type of clutches, such as disc and dog clutches, may be used at different positions of the transmission for achieving the current modes of the transmission.

The invention claimed is:

1. A continuously variable transmission having an input shaft and an output shaft, comprising
a variator unit having an input shaft and an output shaft, and
a planetary gear wheel unit having a planet carrier, a first sun wheel and a second sun wheel,
the input shaft of the transmission being rotationally connectable to the planet carrier and to the input shaft of the variator unit, a shaft rotationally fixed to the first sun wheel being rotationally connectable to the output shaft of the variator unit,
wherein the planet carrier is provided with a first inner set of planet wheels for meshing engagement with the first sun wheel and a second outer set of planet wheels for meshing engagement with the second sun wheel, the first and second sets of planet wheels being in meshing engagement with each other, and a shaft rotationally fixed to the second sun wheel is rotationally connectable to the output shaft of the transmission via a first output member for obtaining a powersplit mode in which power is transmitted via the second sun wheel.

2. A transmission according to claim 1, wherein the transmission comprises a second output member for transmission of power to the output shaft of the transmission.

3. A transmission according to claim 2, wherein the shaft rotationally fixed to the second sun wheel is rotationally connectable to the output shaft of the transmission via the second output member for obtaining a further powersplit mode.

4. A transmission according to claim 2, wherein the planetary gear wheel unit comprises a ring wheel arranged for meshing engagement with the second set of planet wheels, a shaft rotationally fixed to the ring wheel being rotationally connectable to the output shaft of the transmission for obtaining a further powersplit mode, and the shaft rotationally fixed to the ring wheel is rotationally connectable to the output shaft of the transmission via the second output member.

5. A transmission according to claim 2, wherein the second output member is a gearwheel.

6. A transmission according to claim 1, wherein the planetary gear wheel unit comprises a ring wheel arranged for meshing engagement with the second set of planet wheels, a shaft rotationally fixed to the ring wheel being rotationally connectable to the output shaft of the transmission for obtaining a further powersplit mode.

7. A transmission according to claim 6, wherein the shaft rotationally fixed to the ring wheel is rotationally connectable to the output shaft of the transmission via the first output member.

8. A transmission according to claim 1, wherein the output shaft of the variator unit is rotationally connectable to the output shaft of the transmission for obtaining a variator mode.

9. A transmission according to claim 8, wherein the output shaft of the variator unit is rotationally connectable to the output shaft of the transmission via the first output member.

10. A transmission according to claim 1, wherein the transmission comprises a gear unit for providing forward and backward rotation of the output shaft of the transmission.

11. A transmission according to claim 10, wherein the forward and backward gear unit (35) is arranged at the input shaft of the transmission.

12. A transmission according to claim 10, wherein the forward and backward gear unit is arranged at the output shaft of the transmission.

13. A transmission according to claim 1, wherein the variator unit has a first hydraulic machine provided with the input shaft of the variator unit and a second hydraulic machine provided with the output shaft of the variator unit, the first and second hydraulic machines being hydraulically connected to each other.

14. A transmission according to claim 1, wherein the variator unit has a first electric machine provided with the input shaft of the variator unit and a second electric machine provided with the output shaft of the variator unit, the first and second electric machines being electrically connected to each other.

15. A transmission according to claim 1, wherein the first output member is a gearwheel.

16. A working machine comprising a transmission according to claim 1.

* * * * *